(12) United States Patent
Sullivan (10) Patent No.: US 8,731,458 B2
(45) Date of Patent: May 20, 2014

(54) TRANSMISSION AND RETRIEVAL OF REAL-TIME SCOREKEEPING

(76) Inventor: Edward Matthew Sullivan, New York, NY (US)

( * ) Notice: Subject to any disclaimer, the term of this patent is extended or adjusted under 35 U.S.C. 154(b) by 282 days.

(21) Appl. No.: 12/455,474

(22) Filed: Jun. 2, 2009

(65) Prior Publication Data

US 2010/0048187 A1 Feb. 25, 2010

Related U.S. Application Data

(60) Provisional application No. 61/130,683, filed on Jun. 2, 2008, provisional application No. 61/205,104, filed on Jan. 15, 2009.

(51) Int. Cl.
*H04H 20/71* (2008.01)

(52) U.S. Cl.
USPC ... 455/3.03; 455/418; 455/414.2; 707/999.01

(58) Field of Classification Search
USPC .................................. 455/418–420, 3.04–3.06
See application file for complete search history.

(56) References Cited

U.S. PATENT DOCUMENTS

| | | | |
|---|---|---|---|
| 2002/0019677 A1* | 2/2002 | Lee | 700/91 |
| 2002/0049507 A1* | 4/2002 | Hameen-Anttila | 700/92 |
| 2002/0091723 A1* | 7/2002 | Traner et al. | 707/205 |
| 2005/0192825 A1* | 9/2005 | Cardno et al. | 705/1 |
| 2005/0283260 A1* | 12/2005 | Katayama | 700/92 |
| 2007/0015586 A1* | 1/2007 | Huston | 463/42 |
| 2008/0112315 A1* | 5/2008 | Hu et al. | 370/230 |
| 2008/0219658 A1* | 9/2008 | Keane et al. | 396/429 |
| 2013/0064527 A1* | 3/2013 | Maharajh et al. | 386/343 |

* cited by examiner

*Primary Examiner* — Vladimir Magloire
(74) *Attorney, Agent, or Firm* — McDonald Hopkins LLC (57) ABSTRACT

A system and method for transmitting and accessing real-time amateur sports data is provided. The system allows spectators of amateur sporting events to record game data on a mobile electronic device and share live game updates with other amateur sports fans. The system includes a software application configured to operate on a mobile electronic device. Game data may be input into the software application and uploaded to a remote database by way of a wireless network. The remote database may allow third party users to access the game data as it is uploaded to the database in order to follow the progress of the game in real time.

16 Claims, 6 Drawing Sheets

TRANSMISSION AND RETRIEVAL OF REAL-TIME SCOREKEEPING

CROSS-REFERENCE TO RELATED APPLICATIONS

This non-provisional patent application claims the benefit of U.S. Provisional Patent Application No. 61/130,683, entitled "TRANSMISSION AND RETRIEVAL OF REAL-TIME SCOREKEEPING FOR AMATEUR SPORTS," filed Jun. 2, 2008, and U.S. Provisional Patent Application No. 61/205,104, entitled "TRANSMISSION AND RETRIEVAL OF REAL-TIME SCOREKEEPING FOR AMATEUR SPORTS," filed Jan. 15, 2009, both of which are hereby incorporated in their entirety.

FIELD OF THE INVENTION

The present invention generally relates to systems and methods for recording and tracking data and results related to amateur sporting events.

BACKGROUND OF THE INVENTION

Many sports fans enjoy following the live action of a sporting event as it takes place. Fans often attend live sporting events to witness the action in person, or follow a game of interest on a live television or radio broadcast. However, in some instances, fans are unable to either attend a sporting event or follow the game on television or radio. Therefore, various utilities have been developed to provide sports fans with alternative means for tracking live sporting events. For example, internet utilities such as Game Cast allow fans to track game data and statistics over the internet as a game progresses. These internet programs and utilities rely on statistics and data submitted from persons attending the game. Typically, a person at the sporting event may enter game data into a personal computer or other computing device with internet capabilities. The computer or computing device may connect to the internet using internet service provided by the sporting venue. Stats and game data input into the computing device may then be uploaded to the internet and streamed directly to internet users.

Unlike professional sports, amateur sporting events are rarely broadcast on television or radio. Sporting events such as youth sports games, school-sponsored sporting events, amateur adult sports leagues, college sports, and other recreation sporting events are often attended only by friends and relatives of the players. Scoring for such games is often kept by pencil and paper and recorded by a league official when the game is complete. Therefore, fans of amateur sports that are unable to attend a scheduled event are often unable to follow live game action. Moreover, other interested parties such as local and national media outlets that do not have sufficient resources to cover amateur sporting events are often unable collect game information for distribution to news websites or newspapers.

Friends and relatives of persons competing in amateur sports would likely welcome live game updates. For example, parents of children playing in a youth baseball game may appreciate live internet or text message updates for games that they are unable to attend. Additionally, fans attending an amateur sporting event may enjoy greater access to details about the sporting event, such as live statistical data and game information. However, unlike professional sports venues, amateur sporting venues typically do not provide internet access to allow computing devices to connect to the internet. Therefore, there is a need in the art for a new interface to improve the availability of live amateur sports data.

SUMMARY OF INVENTION

A system and method for transmitting and accessing real-time amateur sports data is provided. The system includes a software application configured to operate on a mobile electronic device. The mobile electronic device may be capable of communicating with a wireless phone and data network. The software application is configured to collect and receive live game data related to a sporting event and uploaded the game data to a remote database. The system may include a website to allow third parties to access live game data and receive live streaming play-by-play and scoring updates. The system may further provide text message and email updates to third party users.

In an embodiment, the software application includes a series of menus to assist a user with inputting game data. A user may input game data by selecting the appropriate option from a menu. The software application may further include a graphical illustration of the sporting venue or field. Portions of the graphical illustration may reflect changes in game, based upon game data entered into the mobile electronic device.

DESCRIPTION OF THE DRAWINGS

In the accompanying drawings, which are incorporated in and constitute a part of this specification, embodiments of the invention are illustrated, which, together with a general description of the invention given above and the detailed description given below, serve to illustrate the principles of this invention. The drawings and detailed description are not intended to and do not limit the scope of the invention or the claims in any way. Instead, the drawings and detailed description only describe embodiments of the invention, and other embodiments of the invention not described are encompassed by the claims.

DETAILED DESCRIPTION

The Detailed Description of the Invention merely describes preferred embodiments of the invention and is not intended to limit the scope of the claims in any way. Indeed, the invention as described by the claims is broader than and unlimited by the preferred embodiments, and the terms in the claims have their full ordinary meaning.

A system and method for transferring and distributing live amateur sports data is provided. The game tracking system 10 is designed to accommodate a mobile electronic device 12 and streamline the way information is shared among followers of amateur sports, such as coaches, players, and friends and relatives of players. While the game tracking system 10 is described herein as tracking baseball games and other sports, it will be appreciated that the game tracking system 10 may be used in conjunction with any sport or sporting event.

Figure 1:
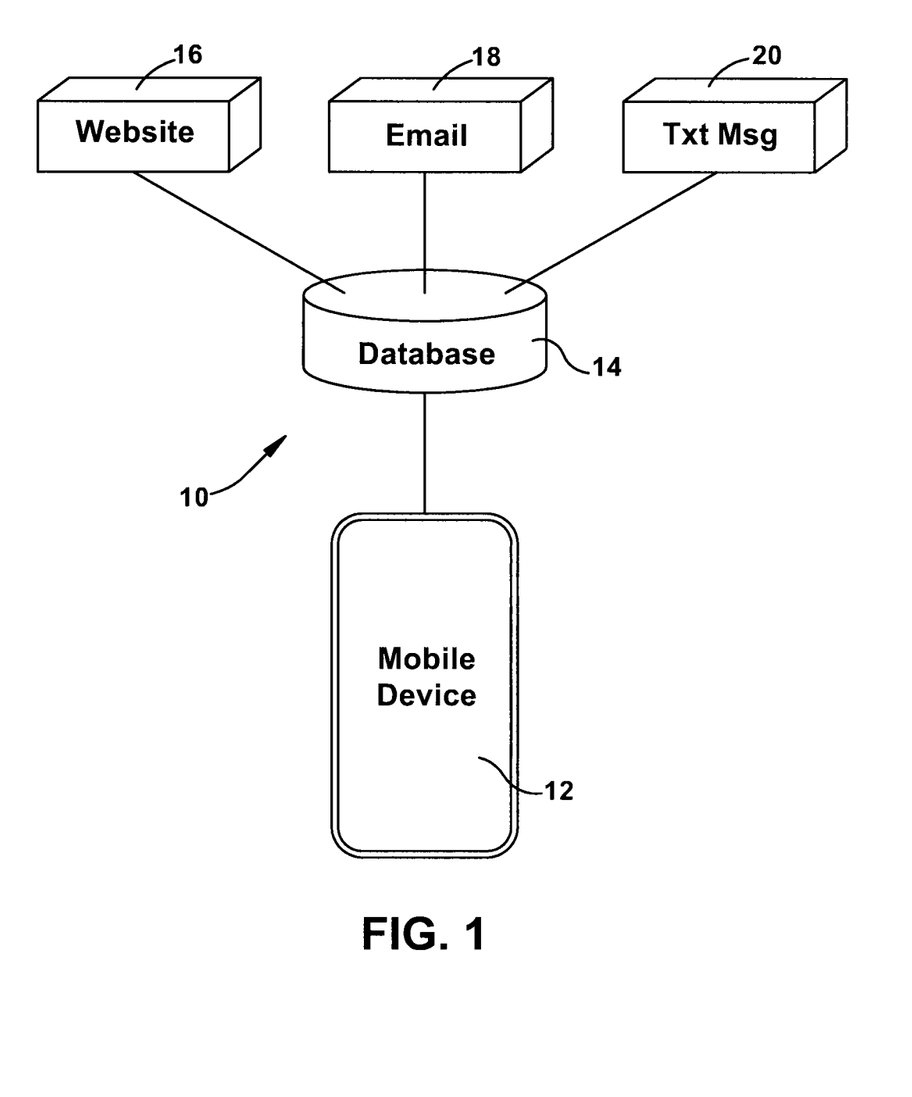
FIG. 1 illustrates a system diagram of a game tracking system.

With reference to FIG. 1, the game tracking system 10 generally includes a software application configured to run on a mobile device 12. The mobile device 12 may include a memory or data storage capable of storing and running the software application. The software application may be configured for keeping score of a sporting event. To that end, the software application may collect and receive data related to a sporting event, such as a live amateur sporting event, and distribute the data for public viewing. Data and statistics related to the sporting event ("game data") may be input into the mobile device 12 by a user at the sporting event. Game data may include, without limitation, numeric data, alphanumeric data, photographic or video data, sound data, other types of digital data, or any data or information related to the sporting event. The game data may be uploaded from the mobile device 12 to a remote database 14, such as an internet server. The database 14 may distribute the game data to make it publicly accessible.

The mobile device 12 may be a portable device configured to communicate with a remote wireless network. The mobile device 12 may include a visual display and a plurality of input devices, such as a keyboard or key pad, touch pad, track ball, microphone, or other buttons or input devices. In an embodiment, the software application may be specifically configured to run on a handheld mobile device 12 other than a laptop or computer. For example, the software application may be configured to run on a wireless handheld device such as a cellular phone, personal digital assistant (PDA), or other handheld device. Preferably, the mobile device 12 will be capable of communicating with a cellular phone and data network. The mobile device 12 may further be small and easily portable, without power chords or other connected cables.

The mobile device 12 may communicate either directly or indirectly with the remote database 14. For example, the mobile device 12 may interface with a wireless network, such as a Wi-Fi network or cellular phone and data network, to send and receive information to and from the a remote database 14 or internet server. The database 14 may prompt the mobile device 12 to enter specific information based on predetermined conditions. Further, the database 14 may allow third party users to track the action of a sporting event by accessing and monitoring the game data received from the mobile device 12 in real time.

The database 14 may store information related to specific amateur sporting events. For example, the database 14 may store rules, regulations and other information related to specific sports leagues, such as a high school baseball league or a recreation soccer league. A mobile device user may upload game information to the database 14, such as the specific league and game for which game data is being recorded. In response, the database 14 may download the corresponding rules and regulations for the specified game to the mobile device 12. The rules and regulations may include metadata and commands to alter how game data is recorded into the mobile device 12 during the game.

The software application may prompt a user to input specific data related to the sporting event being reported. For example, a user entering game data for a baseball game may be prompted to enter information such as player lineups, player statistics such as batting average, or play-by-play information such as pitch counts, balls and strikes, and results from each batter. A user entering game data for a tennis match may be prompted to enter the result of each point played as well as set a game scores. However, the software application may be configured to automatically track and determine game scores and other statistics based upon game data entered by the user.

The software application may further allow a user to input and upload graphical data, such as photographs or videos taken at the sporting event. Photo and video data uploaded by a user may allow third party users to witness game action from amateur sporting events that are not otherwise broadcast. For example, a father that is unable to attend his son's high school baseball game may view uploaded photos of his son crossing home plate to score the winning run. Likewise, video and photo game highlights may be uploaded and viewed by fans, relatives, and coaches. These highlights provide access to photos and videos that are otherwise unavailable for amateur sporting events.

The software application may allow users to input voice or sound data into the mobile device 12 and upload the data to the database 14. Users may input exciting comments related to the game, such as narrating or describing live game action. The voice and sound data may be uploaded to the database 14 to provide a live play by play narration of an amateur sporting event. The excitement in the narrator's voice may enhance the description of game action, much like the announcers at professional sporting events. The software application may further allow users to input statistical data through voice input. For example, the mobile device 12 may include voice and speech recognition capabilities to allow the software application to receive and record game data input by the user's voice. While the mobile device 12 and software application are described as tracking game statistics, photos, and video, and sound clips, it will be appreciated that any information related to the live sporting event may be input into the mobile device 12 and uploaded to the database 14.

Figure 2:
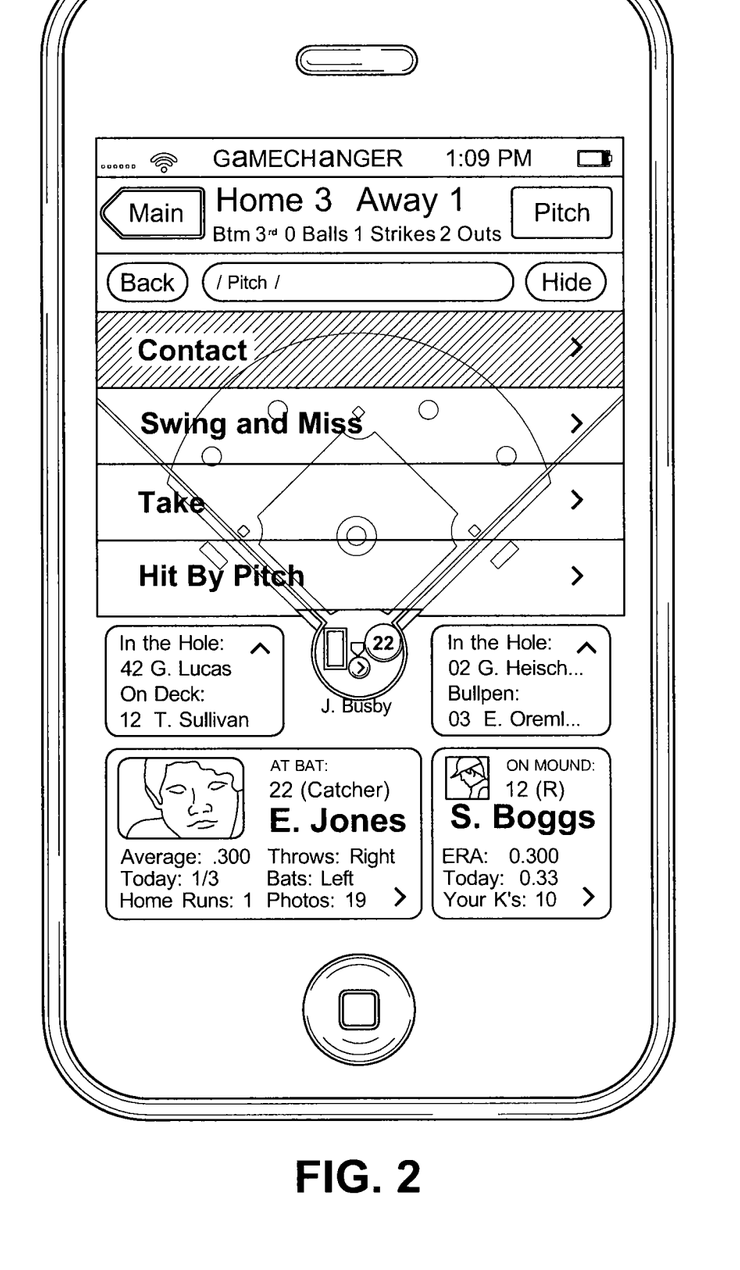
FIG. 2 illustrates a pitch result menu for a baseball game software application.
Figure 3:
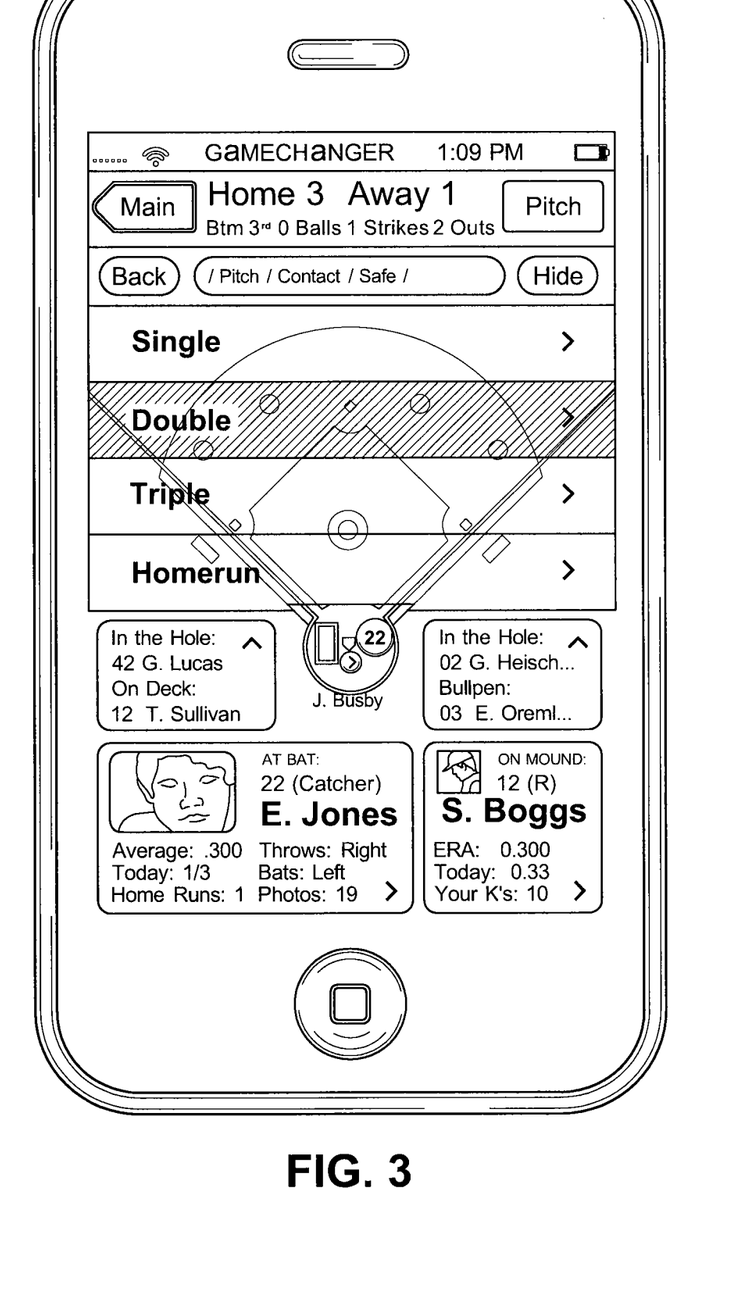
FIG. 3 illustrates an at bat result menu for a baseball game software application.
Figure 4:
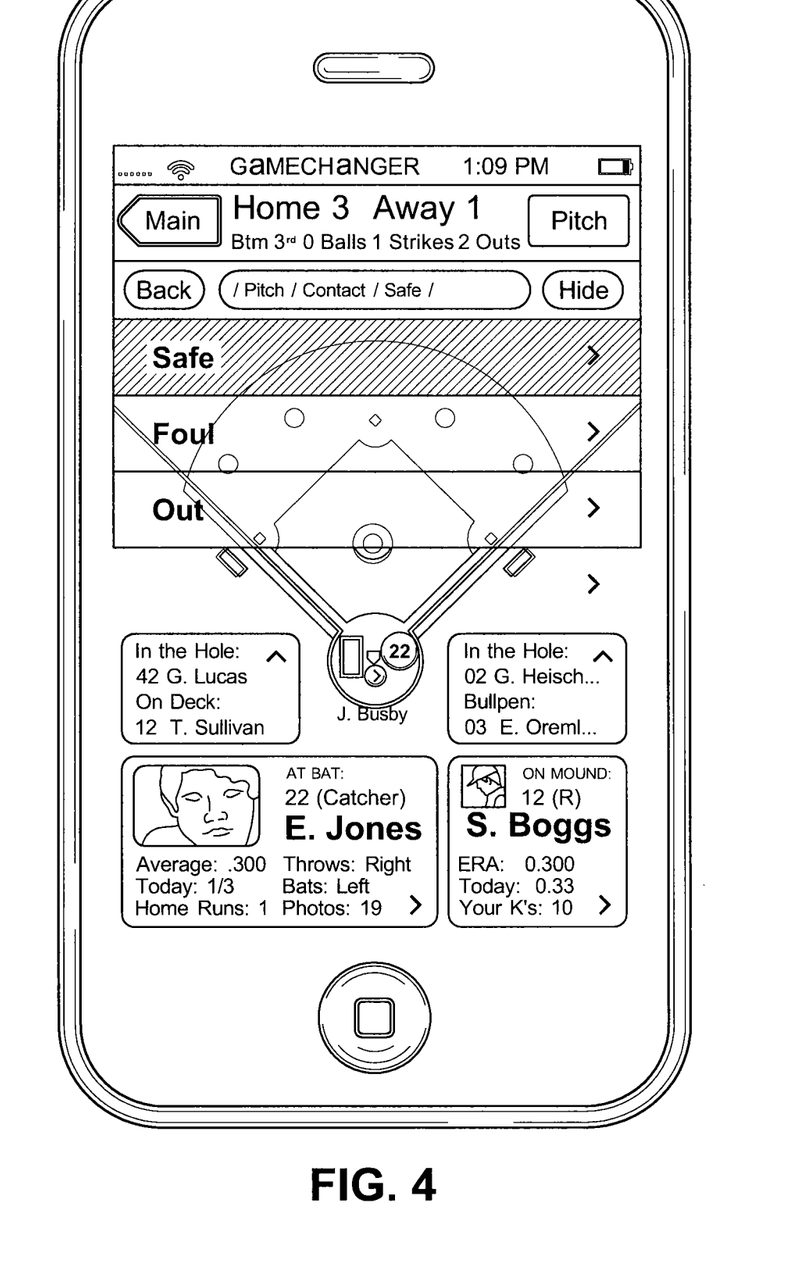
FIG. 4 illustrates a play result menu for a baseball game software application.

The software application may include a series of menus and automated features to assist users with inputting game data. The menus may correspond to the specific game data for the game being recorded. Further, the menus may be configured to correspond to the sport being recorded, based on metadata received from the database 14. Users may enter game data by selecting a choice from the menu. For example, as illustrated in FIGS. 2-4, a baseball game application may include a series of menus to input the results of each play. As shown in FIG. 2, a pitch result menu may include options for "contact," "swing and miss," "take," or "hit by pitch." For each pitch thrown to a batter, the user may select the appropriate result from the menu. The software application may further include menus to record the results of a play, as shown in FIGS. 3 and 4. While the software application is described as utilizing menus to receive game data, it will be appreciated that users may also enter the game data manually, using a keypad or any other input options available on the mobile device 12.

The software application may provide automated data entry features to enhance inputted game data and assist the user with data entry. For example, the software application may track statistics such as game score, player statistics, and other game information based upon inputted game data. The software application may further offer features such as smart sentence and word completion to assist a user with text entry. The software application may include a radio button to allow a user to input voice and sound data. Sound data may be input independently or associated with other game data, such as a narration or commentary on a specific game play.

In an embodiment, the mobile device 12 includes a touch screen interface. The touch screen acts simultaneously as a display and an input device. A user may input game data by interfacing with menus or other graphical representations using the touch screen. For example, a user may select items from a menu by taping the desired menu option. Further, a user may drop and drag items on the display to input game data such as player rosters, locations of players on the field, or places where game action is taking place.

Figure 5:
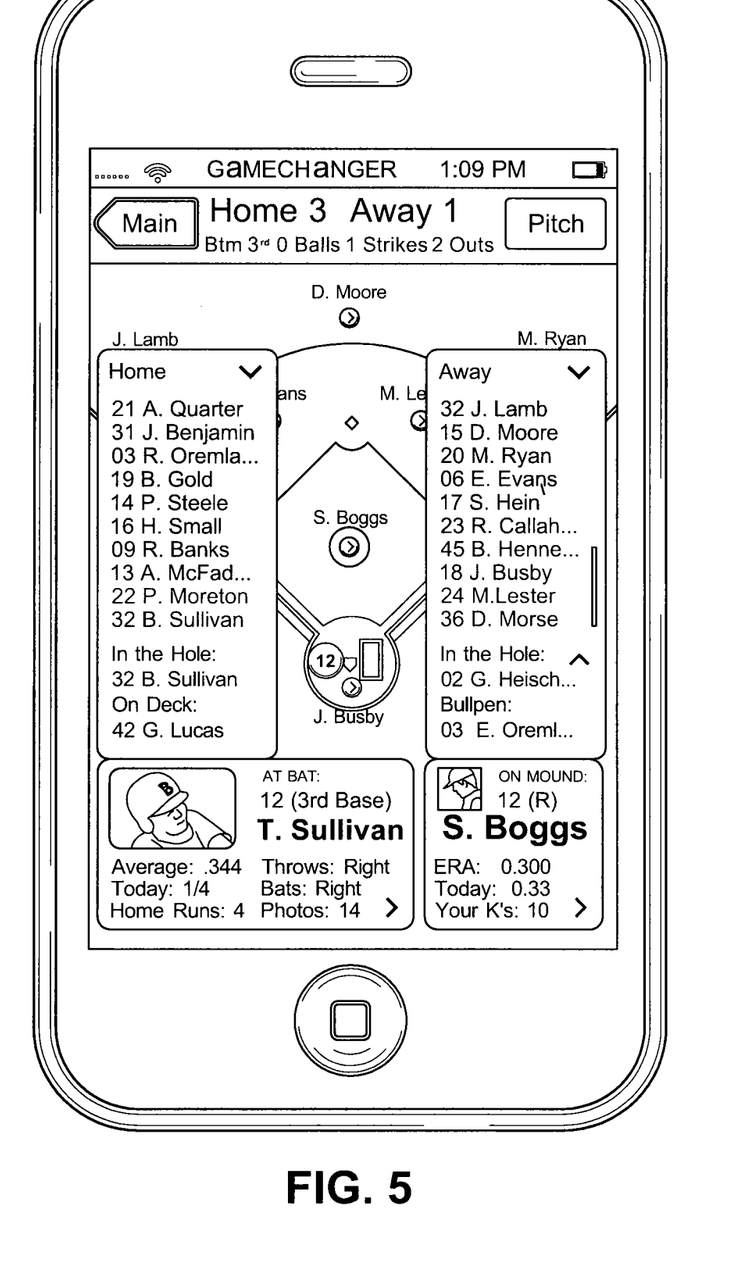
FIG. 5 illustrates a software application on a mobile device having a graphical illustration with pull down menus.
Figure 6:
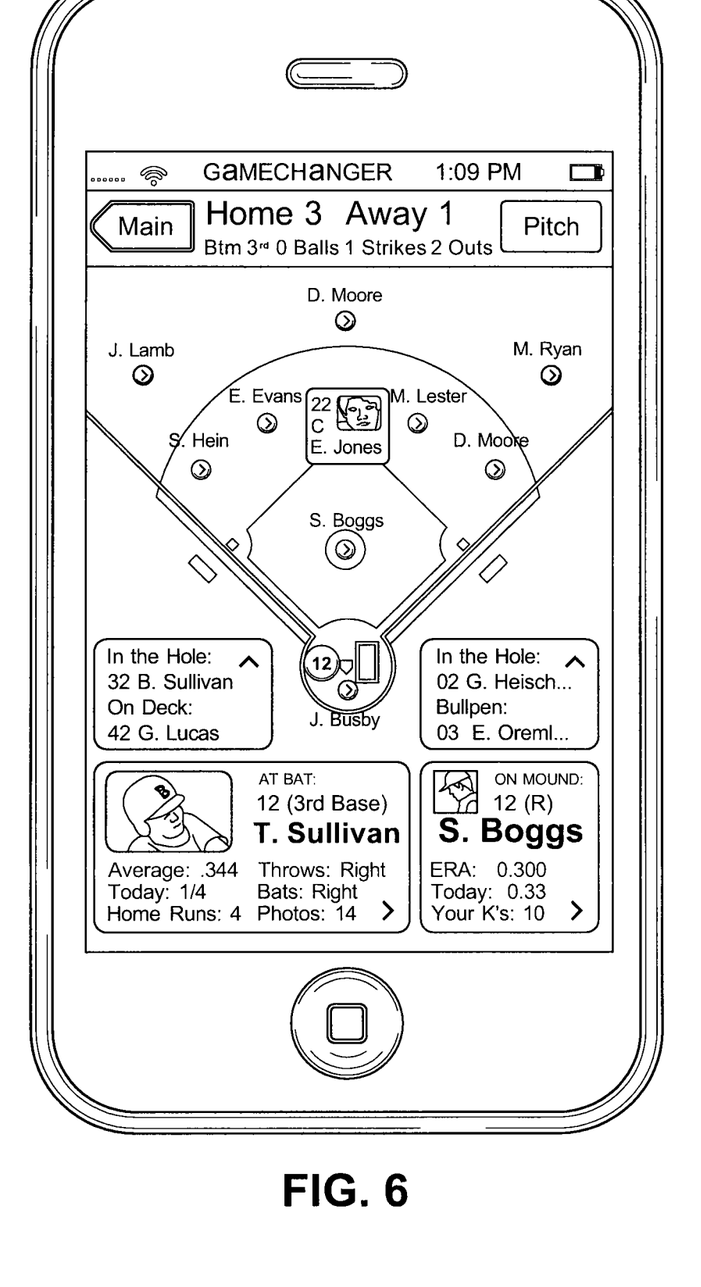
FIG. 6 illustrates a software application on a mobile device having a graphical illustration of a baseball field.

The software application may include a graphical illustration of the field or sports venue. For example, as illustrated in FIG. 5, the mobile device 12 may display a baseball field for inputting baseball related game data. The graphical illustration of the field may reflect changes in game data input into the mobile device 12. For example, as shown in FIG. 6, a software application for a baseball game may display an icon near a base where a player is located. When the player advances to the next base, the icon may move to the corresponding base on the graphical illustration of the field. For mobile devices 12 having a touch screen, the graphical illustration may be updated by touching the player to be moved and dragging them to the next location, such as the appropriate base. The touch screen may further be used to illustrate the location of a ball hit into the field, or other specific points of interest on the field. While the software application is described and illustrated as configured to score a baseball game, it will be appreciated that the software application is not limited thereto and may be configured to score a basketball, football, soccer, or hockey game, or any other sporting event.

Once game data has been input into the mobile device 12, the software application may upload the game data to the database 14 to allow the game data to be accessed at access points by third party users. The software application may establish a continuous connection with the wireless network in order to continuously upload game data and provide the database 14 with live game data updates. Additionally, scheduled updates may be sent from the mobile device 12 to the database. For example, the software application may be configured to upload game data updates at predetermined time intervals. The software application may also be configured to upload game data updates at predetermined points during the games, such as between inning of a baseball game, between quarters or halves of a football, basketball or soccer game, or between sets or games of a tennis match.

The database 14 may allow third party users to access game data and receive live game updates from a plurality of access points. For example, the database 14 may allow an internet website 16 to access game data. Specifically, third party users may view live box scores and game data updates on the website 16 as they are uploaded to the database 14 from the mobile device 12. The website 16 may include a graphical representation of the field or sports venue, similar to the graphical representation on the mobile device 12. The graphical representation may be updated to reflect changes in the game and live play-by-play game action as the game progresses. The website may further display photos from the sporting event taken on the mobile device 12 and uploaded to the database 14.

The website 16 may also provide third party users with additional options for accessing game data. For example, third party users may receive live or scheduled game updates by way of an email 18 or text message 20 to an email address or cell phone. Specifically, a third party user may enter the appropriate information into the website 16, such as email or cell phone number, and request game updates for a specific game. Game updates may be sent to the user as they are received by the database 16, or alternatively on a predetermined schedule such as every hour or half hour.

The database 14 may further provide third party users with voice mail game updates. For example, the database 14 may include a voice mailbox that may be accessed by third party users to hear game data updates. The database 14 may also serve as a cloud or grid network to interface with access points such as the website 16 and third party mobile devices. Specifically, the database 14 may push data to the access points when live updates or new game data is available for public access. This allows third party users to stay informed of live game updates without needing to constantly request updated information.

The website 16 may further record and archive game summaries based on game data submitted during the game. The game summaries may include game statistics, game photos, injury reports, team records, sound, photographic and video data, and other game information. The website 16 may allow third party users to view archived game summaries or receive game summaries via cell phone text or email.

The website 16 may allow third party users to interface with a mobile device user during a game. For example, the website 16 may allow third party users to send text requests to the mobile device user related to the status of the game or players in the game. The software application may display the text requests and allow the mobile device user to respond accordingly. The website 16 may further allow third party users to supplement game data with statistics and other historical data related to the game being recorded and the teams and players involved in the game.

The game tracking system 10 may include means to rate and regulate the accuracy of game data contributed by mobile device users. The website 16 may allow third party users to rate the accuracy of game data contributed by a mobile device user. Specifically, third party users with first hand knowledge of results of a specific game may access the website 16 and view game summaries from the corresponding game. The third party users may then verify the accuracy of the submitted game data by giving the game data a positive rating or leaving positive comments. Alternatively, if the game data in the summary is inaccurate, third party users may leave a negative rating negative comments regarding the inaccuracies.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. A system for tracking information related to a baseball game comprising:
   a mobile electronic device capable of communication with a wireless phone and data network;
   a remote database in communication with said wireless phone and data network;
   a software application running on said mobile electronic device, said software application configured to receive game data from said database related to conducting said baseball game, and wherein said software application is further configured to receive statistical data from a user related to said baseball game and transmit said data to said database once said data is input into said mobile device;
   a plurality of access points capable of accessing said database to view said game data related to said baseball game as it is uploaded to said database from said mobile electronic device in real time;
   wherein said device includes a graphical user interface and said software application is configured to display a graphical representation of a baseball field, and wherein the location of baseball hit into play may be indicated by contacting the corresponding location on said graphical representation of a baseball field; and wherein said software application is configured to prompt a user to input statistical data related to said baseball game, including providing a menu having selections for possible outcomes of a baseball play or baseball pitch, and upload said statistical data to said remote database to allow said statistical data to be shared to said access points.

2. The system of claim 1, wherein said mobile electronic device is a cellular phone.

3. The system of claim 2, wherein said software application is capable of tracking parameters of said baseball game based on data input into said software application.

4. The system of claim 3, wherein said software application is configured to receive video and photographic data and upload said video and photographic data to said database.

5. The system of claim 4 wherein said plurality of access points includes a website configured to display live streaming data from said database related to said baseball game.

6. The system of claim 4, wherein said plurality of access points includes a second mobile electronic device connected to a wireless phone and data network, said second mobile electronic device configured to receive text message data from said database related to said baseball game.

7. The system of claim 6, wherein said database is configured to push said data to said access points once said data is uploaded to said database.

8. The system of claim 4, wherein said software application is configured to receive voice and sound data and upload said voice and sound data to said database.

9. The system of claim 8, wherein said software application includes speech recognition capabilities.

10. The system of claim 9, wherein said software application is configured to convert voice data into numeric and text data.

11. A system for communicating data related to a baseball game comprising:

a database in communication with a wireless data network;

a mobile device in communication with said wireless data network, said mobile device capable of receiving game data from said database related to conducting said baseball game, receiving statistical data from a user related to events in said baseball game, and sending said statistical data to said database and receiving data from said database;

wherein said mobile device includes a graphical user interface and said software application is configured to display a graphical representation of a baseball field, and wherein the location of baseball hit into play may be indicated by contacting the corresponding location on said graphical representation of a baseball field a software application configured to operate on said mobile device, said software application configured to prompt a user to input statistical data related to said baseball game, including providing a menu having selections for possible outcomes of a baseball play or baseball pitch, and upload said statistical data to said remote database; and wherein said database is configured to distribute said statistical data to a plurality of access points in real time.

12. The system of claim 11, wherein portions of said graphical representation change in response to game data related to said baseball game input into said software application.

13. The system of claim 12, wherein said mobile device includes a touch-screen input device capable of simultaneously displaying graphical information and receiving input data.

14. The system of claim 11, wherein said software application is capable of tracking parameters of said baseball game based on data input into said software application.

15. The system of claim 14, wherein said software application is configured to receive and upload photo, and video data related to said sporting event.

16. The system of claim 15, wherein said software application is configured to receive and upload sound data related to said baseball game.

* * * * *